US010176080B2

(12) United States Patent
Berland et al.

(10) Patent No.: US 10,176,080 B2
(45) Date of Patent: Jan. 8, 2019

(54) METHODS AND SYSTEMS FOR CONTENT MANAGEMENT AND TESTING

(71) Applicant: Grand Rounds, Inc., San Francisco, CA (US)

(72) Inventors: Ken Berland, San Francisco, CA (US); Brett Suwyn, San Francisco, CA (US); Bashir Eghbali, San Francisco, CA (US)

(73) Assignee: GRAND ROUNDS, INC., San Francisco, CA (US)

( * ) Notice: Subject to any disclaimer, the term of this patent is extended or adjusted under 35 U.S.C. 154(b) by 0 days.

(21) Appl. No.: 15/269,883

(22) Filed: Sep. 19, 2016

(65) Prior Publication Data

US 2018/0081786 A1    Mar. 22, 2018

(51) Int. Cl.
| | |
|---|---|
| *G06F 9/44* | (2018.01) |
| *G06F 9/445* | (2018.01) |
| *G06F 11/36* | (2006.01) |
| *G06F 8/71* | (2018.01) |
| *G06F 8/60* | (2018.01) |

(52) U.S. Cl.
CPC ............ *G06F 11/3664* (2013.01); *G06F 8/60* (2013.01); *G06F 8/71* (2013.01); *G06F 11/3688* (2013.01)

(58) Field of Classification Search
CPC .......... G06F 8/60; G06F 8/71; G06F 11/3664; G06F 11/3688
USPC ................................ 717/124–135, 174–178
See application file for complete search history.

(56) References Cited

U.S. PATENT DOCUMENTS

| | | | | |
|---|---|---|---|---|
| 9,229,702 | B1* | 1/2016 | Kapulkin | G06F 8/65 |
| 2004/0015408 | A1* | 1/2004 | Rauen, IV | G06Q 10/10 |
| | | | | 705/26.41 |
| 2004/0230941 | A1* | 11/2004 | Marin | G06Q 10/10 |
| | | | | 717/100 |
| 2007/0260478 | A1* | 11/2007 | Szabo | G06F 19/328 |
| | | | | 705/2 |
| 2008/0037452 | A1* | 2/2008 | Tunmer | G06F 8/38 |
| | | | | 370/310 |
| 2010/0064281 | A1* | 3/2010 | Kimball | H04L 41/0853 |
| | | | | 717/124 |
| 2010/0125840 | A1* | 5/2010 | Schneider | G06F 8/65 |
| | | | | 717/172 |
| 2012/0072821 | A1* | 3/2012 | Bowling | G06F 17/2247 |
| | | | | 715/229 |

(Continued)

*Primary Examiner* — Qing Chen
(74) *Attorney, Agent, or Firm* — Finnegan, Henderson, Farabow, Garrett & Dunner LLP

(57) ABSTRACT

Computer-implemented systems and methods are disclosed for deploying documents in a live environment. The systems and methods can provide a configuration environment including a testing environment and a staging environment that can be used to configure documents that can implement software as a system. The documents can provide users with various services, that can be accessed by the documents in a testing staging environment and a live environment. The documents can be used to edit configuration files that can correspond with an entity or a patient. After being edited, a diff utility can be used to calculate and provide differences between a modified configuration file and an original configuration file. Non-transitory computer readable storage media for storing instructions that use the methods are also disclosed.

17 Claims, 10 Drawing Sheets

(56) References Cited

U.S. PATENT DOCUMENTS

2012/0198026 A1\* 8/2012 Roy .................. G06Q 30/0641
　　　　　　　　　　　　　　　　　　　　　709/218
2014/0344224 A1\* 11/2014 LeBert ..................... G06F 8/70
　　　　　　　　　　　　　　　　　　　　　707/684

\* cited by examiner

| Field Name | Admin Name | Admin Value | URL | Actual Value | Comment | Notes |
|---|---|---|---|---|---|---|
| name | Name | Ken's Hardware | https:\\kh.gr.com\config\name | Ken's Hardware | Store Name | Descriptive |
| organization | Organization | Admin | https:\\kh.gr.com\config\org | Administration | Possible Organizations | Sunnyvale |
| plan_id | Plan | 99003 | https:\\kh.gr.com\config\plan | Plan A | From Plans A, B, C, or D | San Francisco |
| logo_file | Logo | logo.jpg | https:\\kh.gr.com\config\logo | logo.jpg | | Palo Alto |
| phone | Phone | 415-349-6789 | https:\\kh.gr.com\config\phone | 415-349-6789 | Mobile Phone | Unknown |
| benefits_dashboard | Benefits Dashboard | Dashboard 101 | https:\\kh.gr.com\config\db | Dashboard 101 | | |
| theme | Theme | KH_blue | https:\\kh.gr.com\config\theme | Ken's H Blue | | Client wants a blue theme |
| email_settings | Email Settings | Weekly Batch | https:\\kh.gr.com\config\es | Weekly Batch | | |
| email | Email | kb@kh.com | https:\\kh.gr.com\config\email | kb@kh.com | | |
| patient_facing_benefits | Viewable Benefits? | Yes | https:\\kh.gr.com\config\vb | Yes | All clients at KH see benefits | |
| new_employee | New Employee | No | https:\\kh.gr.com\config\new_e | No | | Not a new employee |

METHODS AND SYSTEMS FOR CONTENT MANAGEMENT AND TESTING

BACKGROUND

Systems configured to provide a variety of services have increased in complexity over the last decade. Today, many systems implement content management systems (CMS) to integrate the services they provide. CMSs can administer content throughout their lifecycles, from creation to deletion. Content involved can include text, images, audio, video, and other multimedia. The typical stages involved in content management can include creation, editing, testing, publishing, oversight, and removal.

Many types of content management systems currently exist. A web content management system, for example, can include components that automate the production of hypertext markup language (HTML) code. An enterprise content management system (ECM), as another example, can include components that assist with the efficient management of enterprise data. ECMs can include strategies, methods, and tools used to capture, manage, store, and deliver content and documents related to organizational processes. As stated, ECMs can include a variety of capabilities such as document management, web content management, search, collaboration, records management, digital asset management, workflow management, and capturing data. ECM applications can be delivered using different means, including via on-premises software (installed on an organization's own network), software as a service (SaaS) (web access to information that is stored on a remote system), or a hybrid system composed of on-premises and SaaS components.

ECMs can make the management of corporate information easier through simplifying storage, security, version control, process routing, and retention. Benefits from ECMs include improved efficiency, improved control of data, and reduced costs. For example, many banks converted to storing copies of documents within ECMs as opposed to keeping physical checks and contracts in paper warehouses. Previously, requesting a copy of a document might take days or weeks, since someone would need to retrieve a physical copy of the document. With an ECM, an employee anywhere in the world can access a document immediately.

ECMs can include one or more configuration files, which can be used to configure parameters and settings for various programs, websites, users, etc. For example, configuration files can be used to store information about a company or its employees. Configuration files can be obtained when an ECM is initiated, and in some examples can be modified at any time by users. ECMs can reference numerous configuration files, which can correspond to a particular entity, user, or program.

As systems become increasingly complex, various challenges associated with ECMs become more pronounced. For example, when ECMs are configured to provide a myriad of services, ECM creators can find it difficult to efficiently implement user acceptance testing (UAT). Moreover, when ECMs implement many complex configuration files, ECM administrators can find it difficult to track changes made to various configuration files that affect services.

BRIEF DESCRIPTION OF THE DRAWINGS

Reference will now be made to the accompanying drawings showing example embodiments of this disclosure. In the drawings:

FIG. 3 is an exemplary data structure, consistent with embodiments of the present disclosure.

DETAILED DESCRIPTION

Figure 1A:
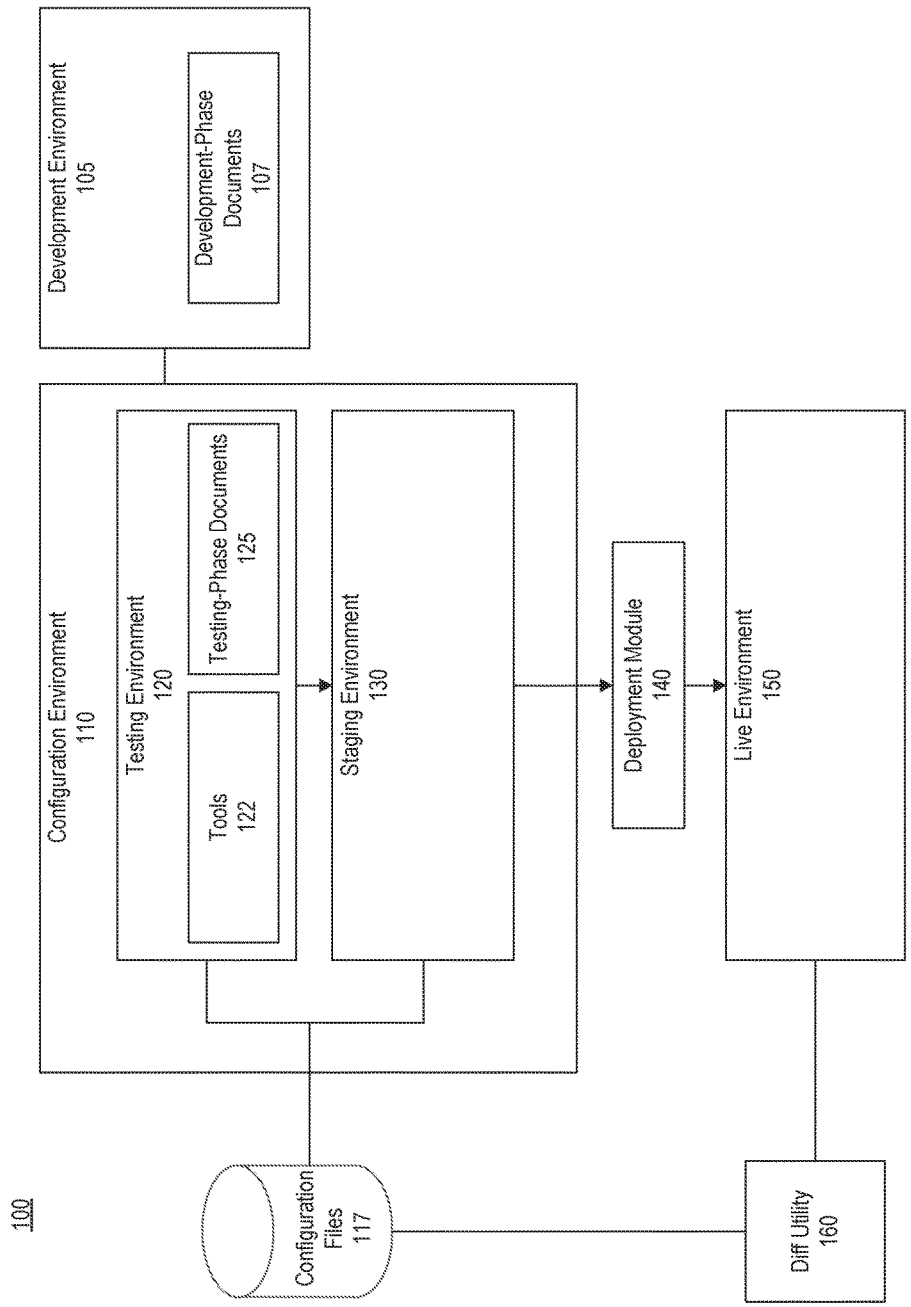
FIGS. 1A-D are block diagrams of an exemplary system for deploying documents into a live environment, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide technologies and techniques for providing and managing services. The embodiments describe systems and methods that allow for the efficient creation, editing, and testing of documents (e.g., web documents). Moreover, the embodiments described herein describe systems and methods that allow users to view, edit, and test modifications made to systems that provide services.

The embodiments describe different environments for creating and testing systems. These systems can include documents such as files, which can be created and tested in a development environment and/or a configuration environment. A configuration environment, in some embodiments, can include a testing environment and a staging environment. In a testing environment documents can be edited. For example, functionality can be added including text, images, scripts, applets, links, web pages, video conferencing, etc. In a staging environment, an entity can view documents as they will be provided to end users in a live environment. By providing a staging environment in addition to a testing environment, an entity can determine whether the documents can correctly provide complex services to many users. For example, a testing environment may not provide a user with functioning links (e.g., in the same manner that an end user would be provided), but, in some embodiments, a staging environment can provide functioning links. In some embodiments described herein, documents in a development environment can be referred to as development-phase documents, documents in a testing environment can be referred to as testing-phase documents, documents in a staging environment can be referred to as staging-phase documents, and documents in a live environment can be referred to as live-phase documents.

Embodiments described herein include a deployment module that can move a set of staging-phase documents from a staging environment to a live environment. In a live environment, live-phase documents can be accessed by one or more end users. In a live environment, end users such as patients and physicians can access services provided by the live-phase documents such as patient care functions.

In some embodiments, one or more configuration files are used by the system (e.g., data from configuration files can be used to populate documents). Configuration files can be accessed in one or more of a testing, staging, and live environment. Configuration files can be used by one or more sets of documents to populate values, images, text, etc. within those documents. For example, a configuration file can include information associated with an entity, such that the website shows information associated with the entity when an end user views the website. In some embodiments, a user creating a system for an entity (e.g., an administrator such as a human resources (HR) professional) can use information from a configuration file such as an entity's logo, color scheme, or other attributes associated with the entity. Similarly, when documents of a system are shown in a configuration environment, before they are launched, the staging-phase documents in the staging environment can incorporate configuration files to show how the staging-phase documents will operate when in a live environment. In addition, in some embodiments, configuration files can be used by live-phase documents in a live environment such that a user (e.g., an employee, which can be a patient) can view information specific to a personal profile (e.g., information associated with their insurance plan, their primary care provider, their dependents, etc.). In some embodiments, a configuration file can include the name of a healthcare plan user and a healthcare plan associated with the healthcare plan user.

In some embodiments, live-phase documents in a live environment can be used to modify configuration files. For example, an employee can modify the number of dependents they have, or an administrator such as an HR or information technology (IT) employee can modify information associated with an entity. In some embodiments, changes can be made to information in a configuration file. For example, in response to an employee changing its number of dependents, a configuration file associated with that employee or that employee's dependents is modified. As additional examples, an administrator may modify a configuration file by editing an entity's logo, editing the number of healthcare plans available to the entity's employees, etc. It should be appreciated that, in some embodiments, a document (e.g., a development-phase document 107, a testing-phase document 125, a staging-phase document 135, and/or a live-phase document 155) can incorporate information from more than one configuration file 117. For example, when an employee views a live-phase document 155 associated with their health care plan or a claim they made, the live-phase document 155 can include information incorporated from a first configuration file 117 associated with an employer, and additional information incorporated from a second configuration file 117 associated with the employee's health plan.

In some embodiments, a diff utility can be invoked to calculate differences between an original configuration file and a modified configuration file. A diff utility can determine differences between configuration files in an efficient manner, for example, by only showing information that was added, deleted, updated, or otherwise modified. A diff utility can provide the difference between a current version of a configuration file and a previous version of the configuration file. This difference can include text indicating a modified portion of the previous version of the configuration file. It should be appreciated that a diff utility can also, in some embodiments, be used to determine a difference between documents such as development-phase documents, testing-phase documents, staging-phase documents, and live-phase documents. For example, the diff utility can be located in a configuration environment. Further, in some embodiments, the diff utility can determine a difference in services that are available to one or more users (e.g., employees, physicians, and/or administrators). In addition, the diff utility can be located in an ECM, within a configuration environment, or elsewhere.

As described above, the diff utility can determine a difference between a first version of one or more documents and/or configuration files and a second version of the one or more documents and/or configuration files. For embodiments described herein, where configuration files can include personal identifying information and/or medical information, a diff utility may be utilized such that it generates and/or causes to be displayed a difference between documents and/or configuration files without disclosing personal identifying information and/or medical information to developers and testers involved at the development and configuration environments.

FIG. 1A is a block diagram of an exemplary system 100 for deploying documents into a live environment, consistent with embodiments of the present disclosure. The components shown in exemplary system 100, in some embodiments, can be included in an ECM. In some embodiments, exemplary system 100 can include development environment 105. In some embodiments, development environment 105 is configured to receive input from users (e.g., software developers), to cause the creation of development-phase documents 107. For example, a group of software developers can create a variety of development-phase documents 107 (e.g., .php files for an ECM) within development environment 105. After development-phase documents 107 are created, in some embodiments, they can be transmitted to configuration environment 110.

In some embodiments, exemplary system 100 can include configuration environment 110. Configuration environment 110 can include testing environment 120 and staging environment 130. Exemplary system 100 can also include a deployment module 140 configured to deploy testing-phase documents 125 into a live environment 150, where they become live-phase documents 155 (of FIGS. 1C and 1D). Live-phase documents 155 can be more finalized versions of testing-phase documents 125 and/or staging-phase documents 135 (e.g., versions of documents intended to reach end users). Exemplary system 100 can also include configuration file(s) 117 that can include information associated with a specific entity, and/or one or more users such as employees of that entity. In addition, exemplary system 100 can include diff utility 160, which can be configured to calculate and provide differences between a configuration file and a modified version of that configuration file.

In some embodiments, configuration environment 110 is configured to receive input to modify testing-phase documents 125. Testing environment 120 can include tools 122 that can be used to modify testing-phase documents 125. For example, tools 122 can include various commands that a software developer can implement, such as insert text, link web pages, configure privileges and user settings, etc. Tools 122 can also be used to create or modify testing-phase documents 125 (e.g., SaaS documents), to modify a work flow associated with services. For example, tools 122 can be used to configure what type of information is requested from an end user, and whether that information should be sent to a nonmedical staffer, a staff physician, and/or an specialized physician. In some embodiments, it is contemplated that a staff physician does not need the same information required by a nonmedical staffer. Similarly, a specialized physician may not need the same information required by a records specialist.

In some embodiments, exemplary system 100 includes configuration files 117. Configuration files 117 can be stored in an ECM, and can be included in configuration environment 110, and/or be remote from configuration environment 110. For example, configuration files 117, or information included therein, can be acquired by development-phase documents 107, testing-phase documents 125 and/or staging-phase documents 135 (of FIG. 1B) and incorporated into the documents. Thus, as documents (e.g., development-phase documents 107, testing-phase documents 125, and/or staging-phase documents 135) are transitioned from one environment to another, one or more configuration files 117 (or information included therein) can be transitioned with the documents.

In some embodiments, configuration files 117 can include information associated with entities (e.g., an entity's logo, an employee's personal information, etc.). For example, an entity can be a chain of restaurants. Particular employees of the chain of restaurants, such as employees in the IT department or HR department can be administrators (e.g., end users with permissions that allow them to change particular information associated with an entity). Administrators can configure information such as a logo associated with an entity, the types of insurance plans available to various employees, addresses associated with locations of different restaurants, etc. In addition to these types of end users, in some embodiments, employees such as managers, waiters, and cooks can access live-phase documents 155 and configuration files 117. It should be understood that a configuration file 117 including personal information associated with an employee can be different from a configuration file 117 including attributes of the entity. Thus, in some embodiments, waiters and cooks may not be able to enter information associated with the chain of restaurants, but can enter information associated with their home address, the names of their dependents, an insurance plan they would like to subscribe to, a claim they would like to input, etc.

In some embodiments, exemplary system 100 can include diff utility 160. Diff utility 160 can be included in configuration environment 110, live environment 150, and/or a module including configuration files 117. In some embodiments, diff utility 160 can be remote from configuration environment 110, live environment 150, and/or a module including configuration files 117. A module is a packaged functional hardware unit designed for use with other components (e.g., portions of an integrated circuit) or a part of a program (stored on a computer readable medium) that performs a particular function of related functions. Diff utility 160 can include components that calculate and/or provide a difference between two or more files. For example, diff utility 160 can calculate and/or provide a difference between two configuration files 117 (e.g., an original configuration file and a modified configuration file).

In some embodiments, an administrator of an entity, such as an IT manager, can access live-phase documents 155 in live environment 150 via their web browser and input information such as a new link to a logo of the entity. Later, another employee of the entity can access information provided by diff utility 160 (e.g., a diff file), that can indicate what information in one or more configuration files 117 has been modified. For example, the employee can view a diff file that indicates that the link to the logo associated with an entity was changed at a particular time by a particular user.

Figure 1B:
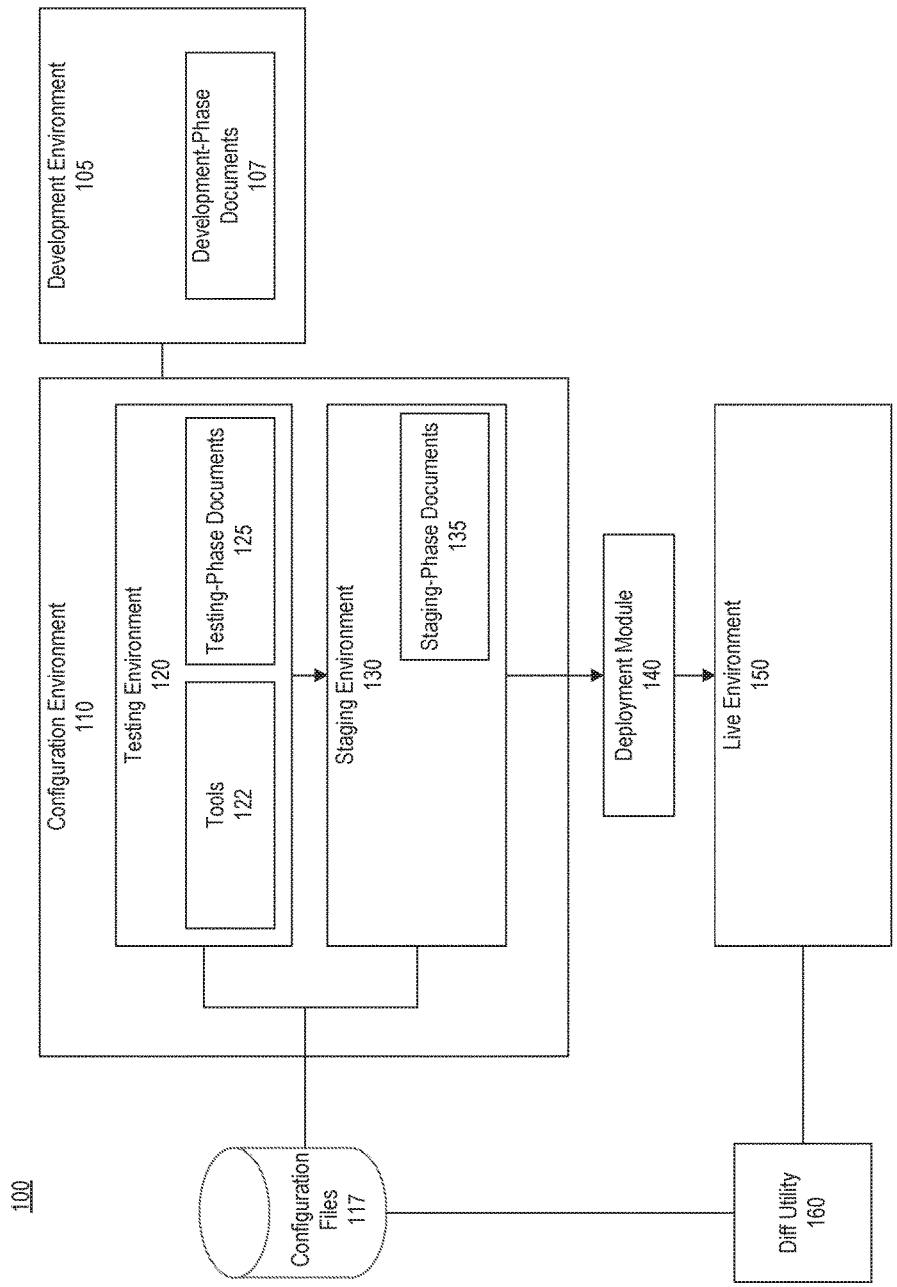

FIG. 1B is a block diagram of an exemplary system 100 for deploying documents into a live environment 150, consistent with embodiments of the present disclosure. In some embodiments, staging environment 130 can be configured to display staging-phase documents 135 in the same way they are intended to be displayed in a live environment (e.g., as live-phase documents 155). For example, a software developer creating or modifying a system (e.g., development-phase documents 107 and/or testing-phase documents 125, which can be a software application), can view development-phase documents 107 and/or testing-phase documents 125 in a first condition while in development environment 105 and/or testing environment 120. In a first condition, testing-phase documents 125 can indicate areas that can be modified. For example, when shown in a first condition, testing-phase documents 125 can include grid lines, objects that indicate hyperlinks, objects that indicate messaging interfaces, etc. In a second condition, staging-phase documents 135 shown in a staging environment 130 can include hyperlinks, messaging interfaces, videos, etc. In this second condition, staging-phase documents 135 can be tested as if they were in live-phase documents 155 used in live environment 150. For example, staging-phase documents 135 can integrate services such as scheduling appointments, providing patient information to a specialized physician, providing a user interface configured to receive input from a records specialist, etc.

Staging-phase documents 135 can be similar to and/or based on testing-phase documents 125. Staging-phase documents 135 can include information included in one or more configuration files 117. As described above, staging-phase documents 135 can show the testing-phase documents 125 in a second condition. For example, testing-phase documents 125 included in testing environment 120 can be shown in an editable first condition (e.g., they can be shown to a user and include objects indicating a work flow, an image, a widget such as a scroll bar or drop down menu, etc.). When staging-phase documents 135 are shown in a second condition, they may not be edited as in testing environment 120, and instead be shown as they would be to an end user (e.g., an administrator, a physician, or an employee). For example, a software developer creating testing-phase documents 125 can test staging-phase documents 135 as if they were deployed in live environment 150. As opposed to viewing testing-phase documents 125 in testing environment 120, staging environment 130 can show staging-phase documents 135 such that they integrate services designed to be provided to end users (e.g., an administrator, a physician, a care coordinator, or an employee). For example, a software developer may not be able to test the functionality of a system when testing-phase documents 125 are displayed in testing environment 120. However, when in staging environment 130, a user can view staging-phase documents 135 and send emails to a staff physician, create a claim, change insurance plans available to specific types of employees, change a website theme associated with an entity, modify configuration files 117, and/or change a logo associated with an entity. Thus, staging environment 130 can provide a software developer creating or testing a system with additional functionality than provided by testing environment 120. In some embodiments, this allows a software developer creating or testing a system to test services that may be too complex to test in testing environment 120.

Figure 1C:
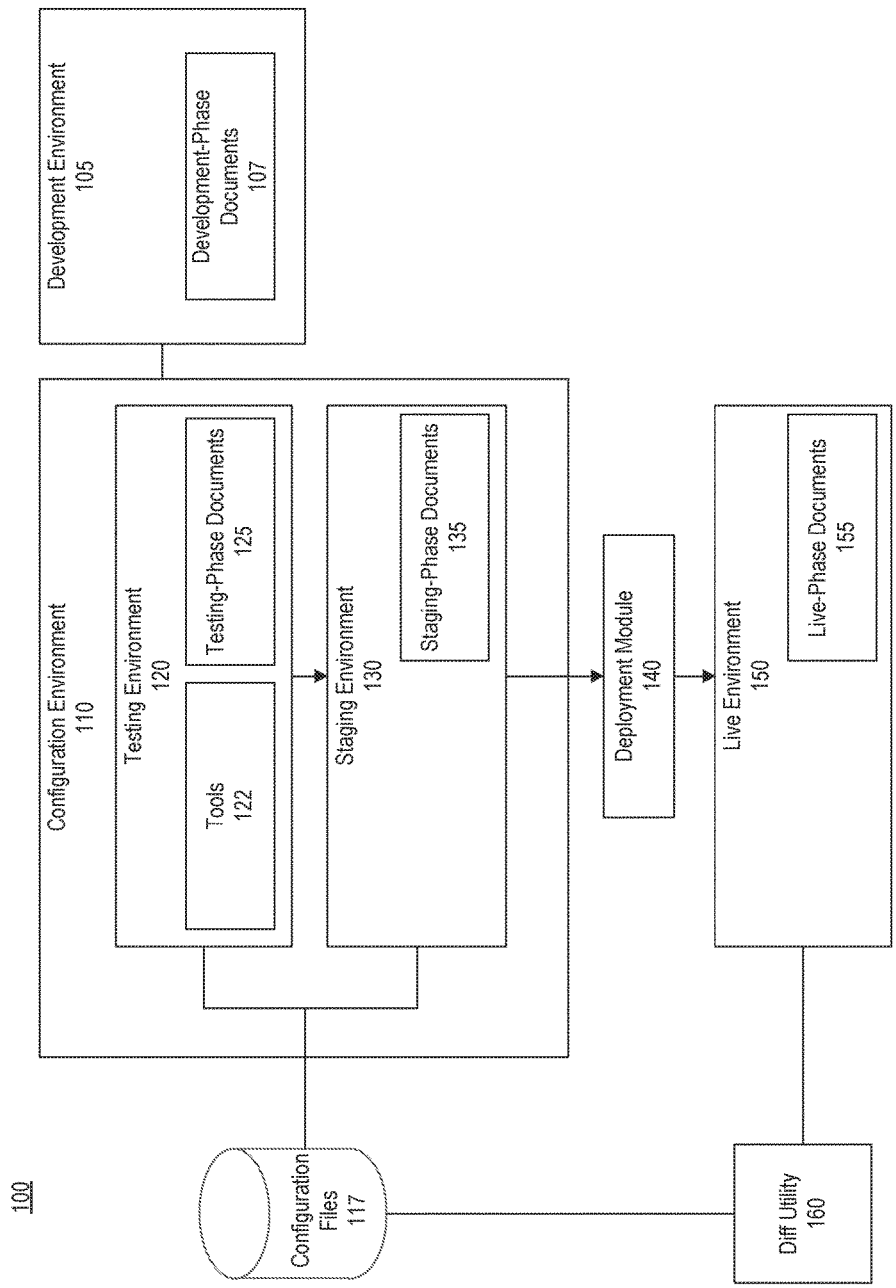

FIG. 1C is a block diagram of an exemplary system for deploying documents into a live environment, consistent with embodiments of the present disclosure. In some embodiments, deployment module 140 can launch staging-phase documents 135 into a live environment 150. For example, a deployment module can include a file transfer program that transfers staging-phase documents 135 to a server, where they are in live environment 150 and become live-phase documents 155. In some embodiments, information from configuration file 117 can be deployed via deployment module 140. For example, testing-phase documents 125 and/or staging-phase documents 135 can include information from configuration files 117. The information from configuration files 117 can be deployed as part of, or along with, testing-phase documents 125 and/or staging-phase documents 135 (e.g., information included in configuration file(s) 117 can become part of the source code implemented in live environment 150). In various embodiments, information from configuration files 117 can be included in live-phase documents 155 when they are transitioned from testing environment 120 and/or staging environment 130

As discussed above, live-phase documents 155 can be deployed versions of testing-phase documents 125 and/or staging-phase documents 135. Live-phase documents 155 can be displayed in a second condition, that can be the same as the second condition that staging-phase documents 135 can be shown in while in staging environment 130. For example, a software developer testing services can use staging-phase documents 135 in staging environment 130, and when they are configured as desired by the software developer, they can be deployed as live-phase documents 155 in live environment 150. When in live environment 150, end users (e.g., administrators, employees, physicians) can interact with live-phase documents 155. As described above, administrators may include IT or HR professionals with particular permissions. The administrators can change configuration files 117 by inputting information into live-phase documents 155, such as how often a group of employees receive emails associated with health care options provided by an employer. In addition, live-phase documents 155 can be accessed by employees that are not administrators. For example, after logging onto a system with their credentials, employees can enter a claim requesting a particular medical procedure using live-phase documents 155. It is contemplated that other services can be accessed by employees interacting with live-phase documents 155.

Figure 1D:
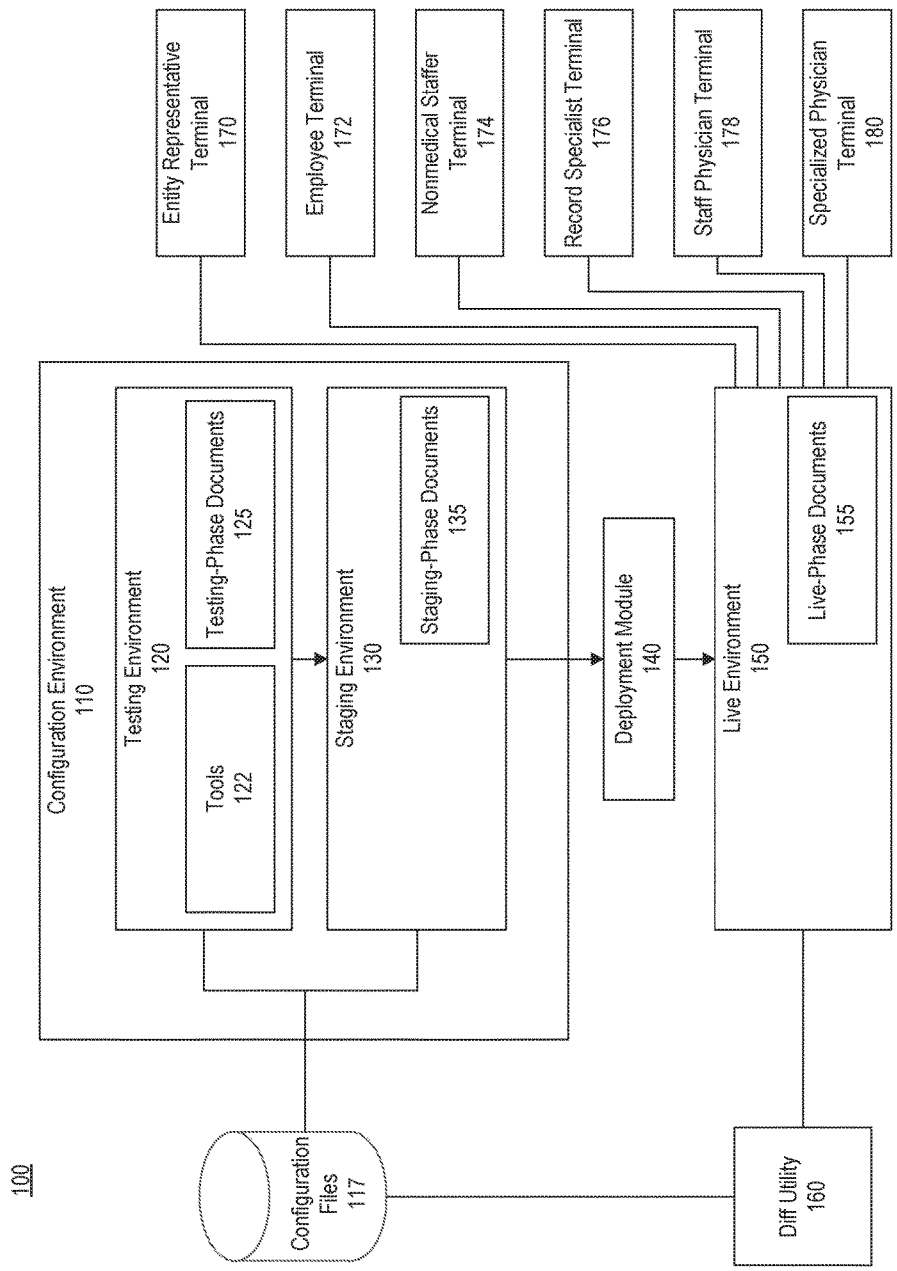

FIG. 1D is a block diagram of an exemplary system 100 for deploying documents into a live environment, consistent with embodiments of the present disclosure. While the embodiment shown in FIG. 1D is directed to a healthcare setting, it is appreciated that the technology described herein is not limited to that setting. In some embodiments, exemplary system 100 can include end user terminals such as entity representative 170, employee terminal 172, nonmedical staffer terminal 174, record specialist terminal 176, staff physician terminal 178, and/or specialized physician terminal 180. Terminals 170, 172, 174, 176, and/or 178 can be a computer, a laptop, a smartphone, a wearable device (e.g., a watch or glasses), a personal digital assistant, a tablet, etc. In some embodiments, each terminal can correspond to an interface (e.g., an employee terminal may include an employee interface).

In some embodiments, entity representative terminal 170 can be configured to receive input from a user to edit attributes associated with an entity. For example, entity representative terminal 170 can be configured to edit a theme of a website associated with: an entity, health and/or dental insurance plans offered to employees of an entity, whether an employee can enter dependents, how often an employee receives emails from exemplary system 100, etc. Entity representative terminal 170 can be used by an IT or HR professional, or some other type of administrator.

In some embodiments, employee terminal 172 can be used by an employee seeking healthcare information. Employee terminal can communicate with documents 155, and display information associated with the employee's health plan. In some embodiments, the employee can talk to a physician via video conference on employee terminal 172.

In some embodiments, nonmedical staffer terminal 174 can be configured to receive input used to determine where to send information received from an employee. For example, nonmedical staffer terminal 174 can receive a claim from an employee that can be directed to one or more staff physicians. In addition, nonmedical staffer terminal 174 can receive information indicating what information must be acquired to complete a claim. Such information can be acquired by a record specialist.

In some embodiments, record specialist terminal 176 can be configured to receive input from a user to acquire medical records. For example, record specialist terminal 176 can receive information associated with an employee, and a record specialist can use that information to send to hospitals, health clinics, and/or health providers to collect information. In some embodiments, information retrieved by record specialist terminal 176 can be added to one or more configuration files 117. For example, information associated with an employee's visit to a provider can be added to a configuration file 117 that is associated with that employee. It is contemplated that, in some embodiments, operations described above in association with a record specialist can be performed automatically.

In some embodiments, staff physician terminal 178 can be configured to receive input from a staff physician that is used to generate a chief complaint or a differential diagnosis, and determine a particular specialized physician to transfer information associated with an employee (e.g., a user that has filed a claim). Staff physician terminal 178 can be configured to provide a video or messaging interface, such that a staff physician and an employee can discuss a claim.

In some embodiments, specialized physician terminal 180 can be configured to receive input from a user that is used to generate a chief complaint or a differential diagnosis. In some embodiments, a specialized physician can provide an employee with a prognosis or treatment using specialized physician terminal 180. For example, specialized physician terminal 180 can receive x-rays, CT scans, images of skin, or other documents, that a physician that specializes in a particular area can use to treat a patient (e.g., an employee).

It is contemplated that additional, or fewer, end user devices can communicate with documents 155.

As discussed above, in some embodiments, services can include work flows associated with entities and employee health care. For example, an employer can access live-phase documents 155 in a live environment 150 and configure services that its employees can access (e.g., an HR department can configure what information is available to employees). In some embodiments, via a set of live-phase documents 155, employees can access services including sending a claim to a nonmedical staffer (e.g., a healthcare employee that is not a physician). For example, the employee can send a message to a nonmedical staffer indicating that the employee would like to see a physician for a specific procedure. In some embodiments, a nonmedical staffer can enter information into a system about the employee and that entered information can then be provided to a staff physician. In addition, a records specialist can gather medical records associated with an employee and provide those records to a system via the documents provided in the live environment. After records are collected, and information is provided to a staff physician, in some embodiments, an employee's information can be provided to a specialized physician that works in an area of medicine associated with the procedure that the employee has requested.

Figure 2:
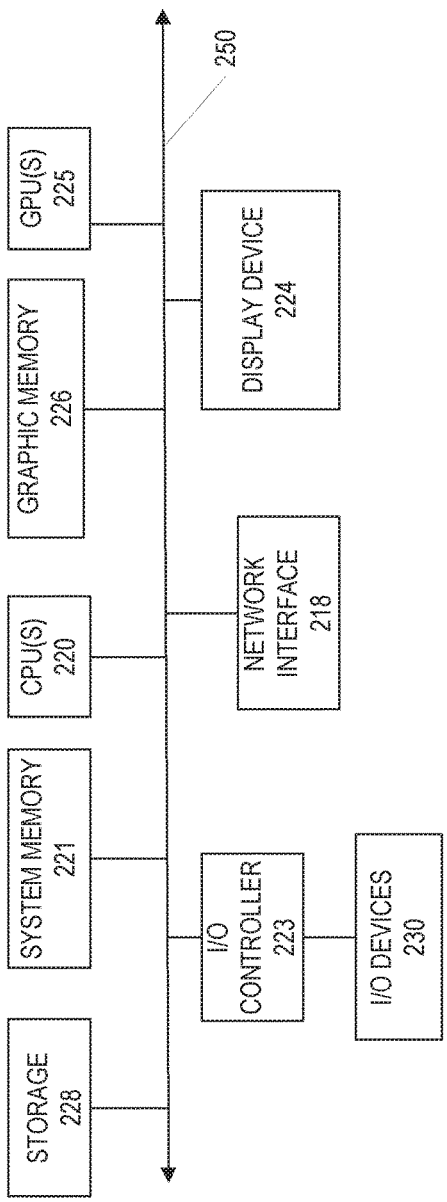
FIG. 2 is a block diagram of an exemplary computing device, consistent with embodiments of the present disclosure.

FIG. 2 is a block diagram of an exemplary computing device 200, consistent with embodiments of the present disclosure. In some embodiments, computing device 200 can be a server including a content management system providing the functionality described herein (e.g., an ECM). Further, computing device 200 can be a second device providing the functionality described herein or receiving information from a server to provide at least some of that information for display. Moreover, computing device 200 can be an additional device or devices that store and/or provide data consistent with embodiments of the present disclosure.

Computing device 200 can include one or more central processing units (CPUs) 220 and system memory 221. Computing device 200 can also include one or more graphics processing units (GPUs) 225 and graphic memory 226. CPUs 220 can be single or multiple microprocessors, field-programmable gate arrays, or digital signal processors capable of executing sets of instructions stored in a memory (e.g., system memory 221), a cache, or a register. CPUs 220 can contain one or more registers for storing variable types of data including, inter alia, data, instructions, floating point values, conditional values, memory addresses for locations in memory (e.g., system memory 221 or graphic memory 226), pointers, and counters. CPU registers can include special purpose registers used to store data associated with executing instructions such as an instruction pointer, instruction counter, and/or memory stack pointer. System memory 221 can include a tangible and/or non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive and/or flash memory, processor cache, memory register, or a semiconductor memory.

For example, embodiments described herein can include a non-transitory computer readable medium storing instructions that are executable by one or more computing devices (e.g., computing device 200 of FIG. 2) that includes one or more processors that cause the one or more computing devices 200 to deploy documents (e.g., testing-phase documents 125 and/or staging-phase documents 135 of FIGS. 1A, 1B, 1C and/or 1D) into a live environment (e.g., live environment 150 of FIGS. 1A, 1B, 1C, and/or 1D). For example, the one or more computing devices can provide configuration environment 110 having testing environment 120 and/or staging environment 130 and can provide deployment module 140 (which can be stored in system memory 221) and live environment 150. The deploying of testing-phase documents 125 and/or staging-phase documents 135 into a live environment can include obtaining a configuration file (e.g., configuration file(s) 117 of FIGS. 1A, 1B, 1C, and/or 1D) from memory (e.g., system memory 221), and providing a configuration environment (e.g., configuration environment 110 of FIGS. 1A, 1B, 1C, and/or 1D).

In some embodiments, the one or more computing devices can provide configuration environment 110 having a testing environment (e.g., testing environment 120 of FIGS. 1A, 1B, 1C, and/or 1D) configured to show a set of testing-phase documents 125 in a first condition. The testing environment 120 can include tools (e.g., tools 122 of FIGS. 1A, 1B, 1C, and/or 1D) to modify testing-phase documents 125. The configuration environment 110 can also include a staging environment (e.g., staging environment 130 of FIGS. 1A, 1B, 1C, and/or 1D) configured to show the set of staging-phase documents 135 in a second condition and functionality associated with the set of live-phase documents 155 (e.g., where functionality can be a configuration to implement services). In some embodiments, at least a portion of a set of staging-phase documents 135 is configured to incorporate configuration file 117 while shown in staging environment 130. In some embodiments, in addition to the configuration environment 110, testing-phase documents 125 and/or staging-phase documents 135 can be deployed into a live environment (e.g., live environment 150 of FIGS. 1A, 1B, 1C, and/or 1D). Live environment 150 can be configured to show the set of live-phase documents 155 in the second condition (e.g., in the same manner as shown in staging environment 130). Further, at least a portion of the set of live-phase documents 155 can be configured to incorporate configuration file 117 while shown in live environment 150. In some embodiments, the one or more computer devices can include deployment module 140, live environment 150, and diff utility 160 (which can also be stored in system memory 221).

In some embodiments, system memory 221 can be one or more memory chips capable of storing data and allowing direct access by CPUs 220. System memory 221 can be any type of random access memory (RAM), or other available memory chip capable of operating as described herein.

CPUs 220 can communicate with system memory 221 via a system interface 250, sometimes referred to as a bus. GPUs 225 can be any type of specialized circuitry that can manipulate and alter memory (e.g., graphic memory 226) to provide and/or accelerate the creation of images. GPUs 225 can store images in a frame buffer for output to a display device such as display device 224. GPUs 225 can have a highly parallel structure optimized for processing large, parallel blocks of graphical data more efficiently than general purpose CPUs. Furthermore, the functionality of GPUs 225 can be included in a chipset of a special purpose processing unit or a co-processor.

CPUs 220 can execute programming instructions stored in system memory 221 or other memory, operate on data stored in memory (e.g., system memory 221) and communicate with GPUs 225 through the system interface 250, that bridges communication between the various components of computing device 200. In some embodiments, CPUs 220, GPUs 225, system interface 250, or any combination thereof, are integrated into a single chipset or processing unit. GPUs 225 can execute sets of instructions stored in memory (e.g., system memory 221), to manipulate graphical data stored in system memory 221 or graphic memory 226. For example, CPUs 220 can provide instructions to GPUs 225, and GPUs 225 can process the instructions to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Computing device 200 can include display device 224 and input/output (I/O) devices 230 (e.g., a keyboard, a mouse, or a pointing device) connected to I/O controller 223. I/O controller 223 can communicate with the other components of computing device 200 via system interface 250. It is appreciated that CPUs 220 can also communicate with system memory 221 and other devices in manners other than through system interface 250, such as through serial communication or direct point-to-point communication. Similarly, GPUs 225 can communicate with graphic memory 226 and other devices in ways other than system interface 250. In addition to receiving input, CPUs 220 can provide output via I/O devices 230 (e.g., through a printer, speakers, or other output devices).

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

FIG. 3 is an exemplary data structure 300 consistent with embodiments of the present disclosure. Data structure 300 can store data records associated with configuration files 117. While data structure 300 is shown to store information related to an entity (e.g., a company), it is appreciated that it can store information related to any service, such as user data (e.g., an employee and/or patient) or any data type (e.g., text, image, audio, etc.). Data structure 300 can, for example, be a database, a flat file, data stored in memory (e.g., system memory 221), and/or data stored in any other suitable storage mechanism (e.g., storage 228).

In some embodiments, data structure 300 can be a Relational Database Management System (RDBMS) (e.g., Oracle Database, Microsoft SQL Server, MySQL, PostgreSQL, and/or IBM DB2). An RDBMS can be designed to efficiently return data for an entire row, or record, in as few operations as possible. An RDBMS can store data by serializing each row of data of data structure 300. For example, in an RDBMS, data associated with record 332 of FIG. 3 can be stored serially such that data associated with all categories of record 332 can be accessed in one operation. Moreover, an RDBMS can efficiently allow access of related records stored in disparate tables. For example, in an RDBMS, data structure 300 and second data structure can be linked by a referential column. An RDBMS can allow for the efficient retrieval of all records in a second data structure associated with a record of data structure 300 based on a common value for the respective fields (e.g., new_employee of data structure 300 and a set of new employees stored in a second data structure).

In some embodiments, data structure 300 of FIG. 3 can be a non-relational database system (NRDBMS) (e.g., XML, Cassandra, CouchDB, MongoDB, Oracle NoSQL Database, FoundationDB, and/or Redis). A non-relational database system can store data using a variety of data structures such as, among others, a key-value store, a document store, a graph, and a tuple store. For example, a non-relational database using a document store could combine all of the data associated with a particular entry into a single document encoded using XML. In this example, the XML document would include the information stored in record 352 of data structure 300 and the employees of a second data structure that are new.

Data structure 300 can include categories of data representing an entity. For example data structure 300 can include categories Field Name 310, Admin Name 312, Admin Value 314, URL 316, Actual Value 318, Comment 320, and/or Notes 330. Data associated with data records can be stored under each of these categories. For example, an entity represented by data structure 300 can have entries associated with Field Names 310: name 332, organization 334, plan_id 336, logo_file 338, phone 340, benefits_dashboard 342, theme 344, email_settings 348, patient_facing_benefits 350, and new_employee 352.

In some embodiments, data structure 300 can contain more or fewer categories for each data record. For example, data structure 300 can include additional categories of data such as staff physician information, specialized physician information, hospitals where records can be stored, etc. Additionally, data structure 300 can include combination categories. For example, instead of only using comment 320 to represent information, data structure 300, in some embodiments, includes comments associated with particular dates or physician interactions. This data can be stored under one category or separate categories that, together, represent a comment associated with an entry. In some embodiments, data stored under a category can be a reference into another data set or data structure as is common in relational data sets. For example, URL 316 can contain an identifier that references a description stored in a separate data set or lookup table.

In some embodiments, configuration file 117 can include data structure 300. Data structure 300 can be modified by an end user (e.g., an administrator, an employee, a physician, etc.). For example, an administrator may use live-phase documents 155 to edit the name of an organization included in data structure 300, the URL of a logo, a theme associated with an entity's employee-facing websites, a phone number associated with an entity, etc. In addition, configuration files can include employee and/or patient information, such as personal information, information associated with an employee's health history, information associated with a claim submitted by an employee, notes added by a physician, etc. In some embodiments, information in data structure 300 that is modified by an end user can be inputted into diff utility 160. Diff utility 160 can determine and provide differences between data structure 300 before it was modified and after it was modified. As described above, by providing differences, diff utility can allow an administrator or other user to view differences in configuration files, or services available to an end user, without showing that administrator personal identifying information and/or health information.

Figure 4:
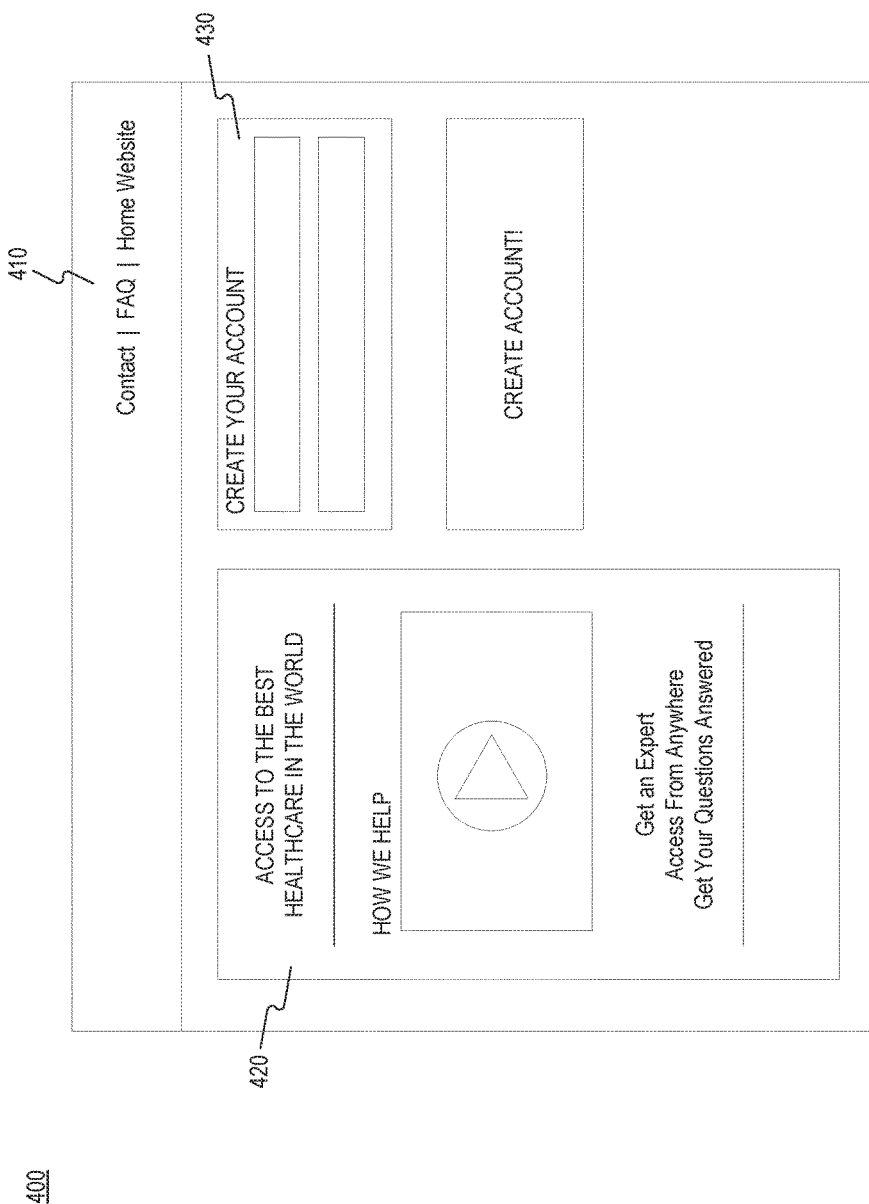
FIG. 4 is an exemplary user interface, consistent with embodiments of the present disclosure.

FIG. 4 is an exemplary user interface 400 consistent with embodiments of the present disclosure. User interface 400 can correspond with one or more live-phase documents 155 and/or configuration files 117. For example, a live-phase document 155 can be a .php file that incorporates and displays information from a configuration file 117 on a web browser. In some embodiments, user interface 400 can be accessed via employee terminal 172. For example, an employee intending to create a new account with a system can create an account via widget 430. User interface 400 can also include a section 420 describing services provided, and a menu bar 410. The information included in section 420 and menu bar 410 can be determined based on configuration files 117. In some embodiments, the information included in section 420 and menu bar 410 can be determined based on live-phase documents 155 alone. In fact, in some embodiments, live-phase documents 155 can be displayed and/or operate as intended without incorporating configuration files 117. In some embodiments, a portion of live-phase documents 155 can be displayed and/or operate as intended without incorporating configuration files 117 while another portion of live-phase documents 155 require configuration files 117 to be displayed and/or operate as intended.

As discussed above, administrators, employees, physicians, etc. can enter information into user interface 400 that can be used to create or modify configuration file 117. For example, by creating an account, a configuration file associated with the created account can be created. In various embodiments, a diff utility can determine whether a newly created configuration file contains information for the same person. If it does, for example, a notification can be generated indicating that a duplicative configuration file exists. In some embodiments, a duplicative configuration file may be merged automatically, or deleted automatically. In some embodiments, information entered into user interface 400 is automatically entered into diff utility 160, which, as described above, can generate a difference between a first configuration file 117 and a modified configuration file 117 for display.

Figure 5:
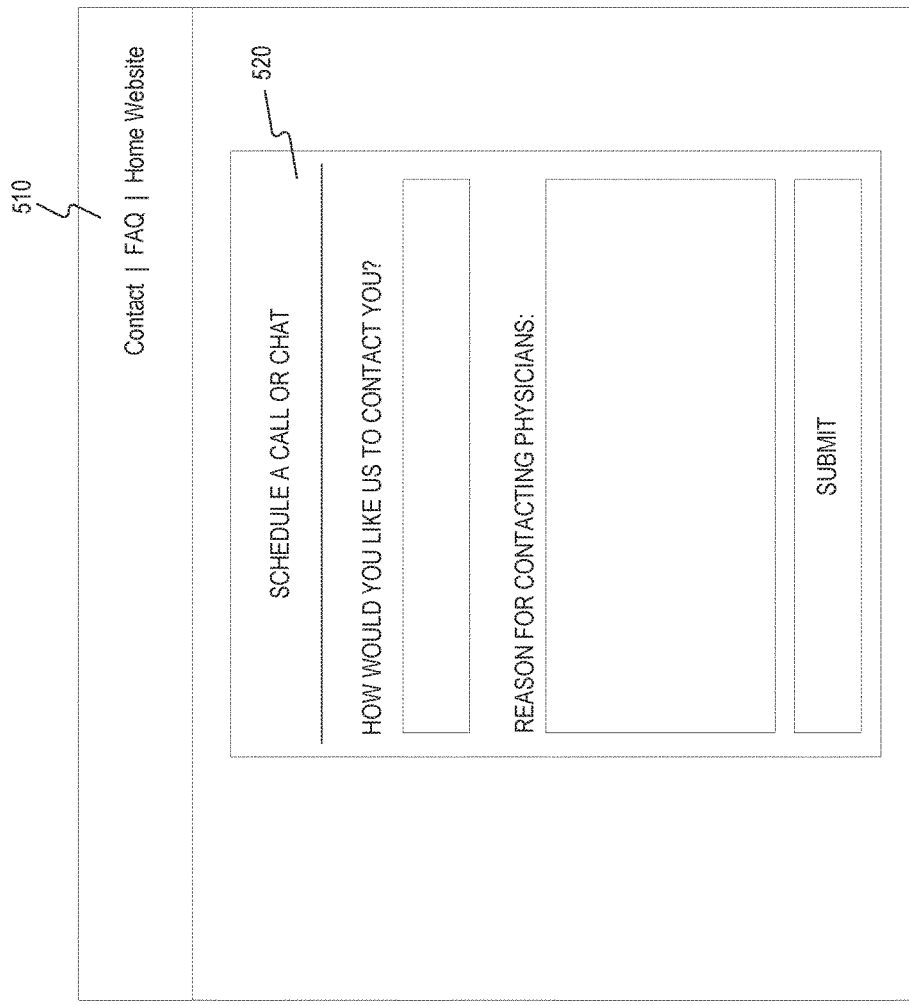
FIG. 5 is an exemplary user interface, consistent with embodiments of the present disclosure.

FIG. 5 is an exemplary user interface 500 consistent with embodiments of the present disclosure. User interface 500 can correspond with one or more live-phase documents 155 and/or configuration files 117. For example, a live-phase document 155 can be a .php file that incorporates and displays information from a configuration file 117 on a web browser. In some embodiments, user interface 500 can be accessed via employee terminal 172. For example, an employee intending to schedule a call or online chat with a physician can use interface 520. User interface 500 can also include a menu bar 510, which can be based on configuration files 117 and/or live-phase documents 155. In some embodiments, information inputted into user interface 500 can be used to modify configuration file 117. For example, in response to an employee entering information to schedule a call, configuration file 117, which may be associated with that employee, may be updated to reflect the information entered via user interface 500. In some embodiments, modified configuration file 117 may be compared to an original configuration file 117 by diff utility 160. Diff utility 160 may create a diff file, or otherwise indicate changes made in configuration file 117. In some embodiments, the diff file can be viewed by an administrator, a software developer, an employee, a physician, etc., such that the viewer can see what changes were made, without being exposed to medical and/or health information.

Figure 6:
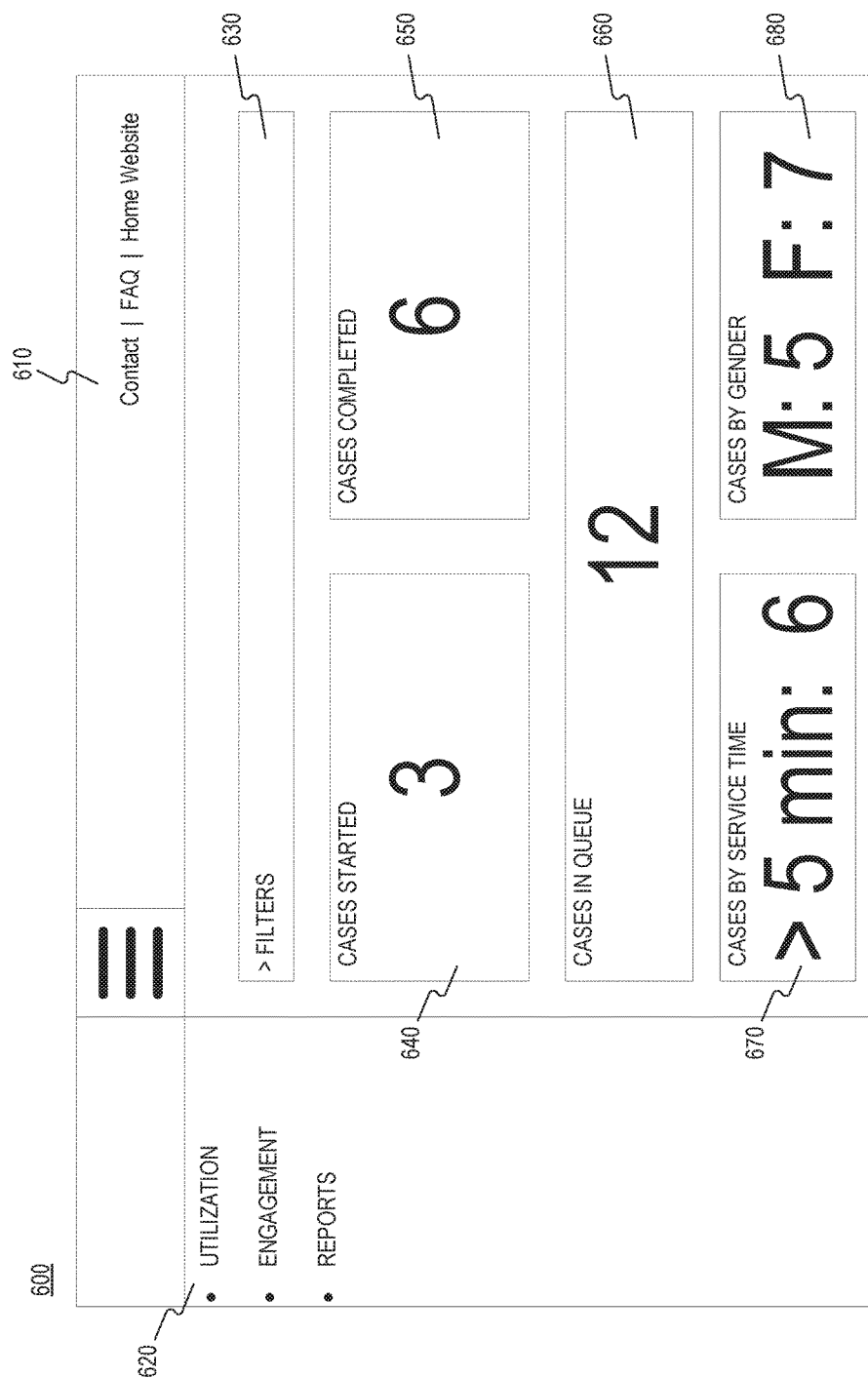
FIG. 6 is an exemplary user interface, consistent with embodiments of the present disclosure.

FIG. 6 is an exemplary user interface 600 consistent with embodiments of the present disclosure. User interface 600 can correspond with one or more live-phase documents 155 and/or configuration files 117. For example, a live-phase document 155 can be a .php file that incorporates and displays information from a configuration file 117 on a web browser. In some embodiments, user interface 600 can be accessed via a specialized physician terminal 180. For example, a specialized physician can use widget 630 to filter its cases based on various attributes. User interface 600 can also indicate an amount of cases started via interface 640, a number of cases completed via interface 650, a number of cases in a queue via interface 660, a number of cases completed in a particular time via interface 670, and a number of cases based on a patient's gender via interface 680. In some embodiments, user interface 600 can include a menu 620 and a menu bar 610 that can be based on configuration files 117 and/or documents 550. For example, menu 620, or interfaces 640, 650, 660, 670, and/or 680 based on configuration files 117 that are associated with a specialized physician.

Similar to user interfaces 400 and 500, user interface 600 can be used to create and/or modify a configuration file 117. For example, multiple configuration files can be used by live-phase documents 155 that display information associated with various employee and/or patient claims. A physician can also have a configuration file 117 that is associated with themselves and that includes information such as the number of cases in a queue. In some embodiments, in response to a physician entering information into a live-phase document 155, such as a response to a question from an employee and/or patient, a configuration file associated with the employee and/or patient can be updated and a configuration file associated with the physician can be updated. For example, the configuration file associated with the employee and/or patient can be updated to reflect a diagnosis entered by a physician, and the configuration file associated with the physician can be updated to reflect the number of cases in a queue, the number of cases completed, an average amount of time to complete a case, etc. In some embodiments, diff utility 160 can be used to determine differences between an updated configuration file and the configuration file prior to updating.

Figure 7:
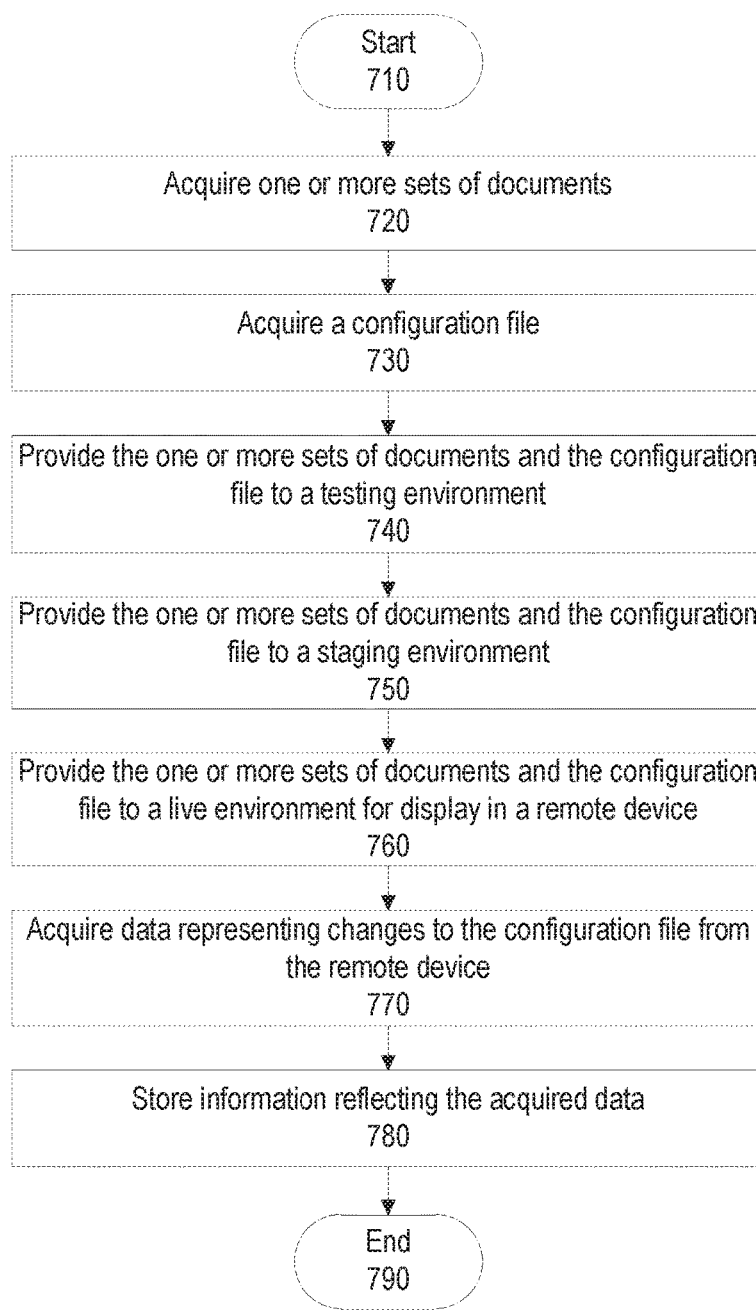
FIG. 7 is a flowchart of an exemplary method for deploying documents into a live environment, consistent with embodiments of the present disclosure.

FIG. 7 is a flowchart of an exemplary method 700 for deploying documents into a live environment, consistent with embodiments of the present disclosure. It will be readily appreciated that the illustrated procedure can be altered to delete steps or further include additional steps. The method can be provided by one or more set of instructions stored on a nontransitory computer readable medium. The set of instructions can then be provided to one or more processors (e.g., CPU 220) to cause one or more computers of system (e.g., system 100 from FIGS. 1A-1D) to performed the specialized functionality provided in the embodiments described herein.

After initial step 710, the system can acquire (step 720) one or more sets of testing-phase documents 125. At this point, a software developer can edit the testing-phase documents.

The system can further acquire (step 730) a configuration file (e.g., from configuration files 117). As previously described, the configuration files 117 can include information associated with the types of insurance plans an entity offers, information associated with an employee, and/or information associated with a staff physician and/or a specialized physician.

The system can provide (step 740) the one or more sets of documents (e.g., documents 125) and a configuration file to a testing environment (e.g., testing environment 120). Testing environment 120 can provide tools 122 configured to modify testing-phase documents 125. Tools 122 can include software configured to modify testing-phase documents 125. After being created, edited, or modified in testing environment 120, one or more sets of documents 125 and a configuration file 117 can be provided (step 750) to a staging environment 130. As described above, a staging environment 130 can be included in a configuration environment to perform UAT. This testing can include different services and incorporate information from configuration files 117.

The system can also provide (step 760) one or more sets of documents 735 to a live environment for display in a remote device (e.g., entity representative terminal 170, employee terminal 172, nonmedical staffer terminal 174, record specialist terminal 176, staff physician terminal 178, and/or specialized physician terminal 180). At these remote devices, users can modify information in configuration files 117. For example, in some embodiments live-phase documents 155 can be accessed by remote devices. Live-phase documents 155 can be created in development environment 105, modified and/or tested in testing environment 120, tested in staging environment 130, and/or deployed into live environment 150. In some embodiments, remote devices (e.g., entity representative terminal 170, employee terminal 172, nonmedical staffer terminal 174, record specialist terminal 176, staff physician terminal 178, and/or specialized physician terminal 180) can be a portal accessed via a web browser or a server. It should be understood that the remote devices described herein do not need to be dedicated machines, and can refer to a particular URL or website.

After live-phase documents 155 are deployed, an employee of a company such as an IT employee or an HR employee (or another type of system administrator) can use entity representative terminal 170 to configure documents associated with an entity or the employees of the entity. Although entities and their employees are described herein, it should be understood that the system, configuration files, and documents can include information for users other than employees (e.g., patients, clients, subscribers, customers, etc.). In some embodiments, entity representative terminal 170 can be configured to modify live-phase documents 155 configured to modify a set of characteristics associated with an entity such as its name, logo, address, subsidiaries, health insurance plans offered to employees, etc. In some embodiments, entity representative terminal 170 can be configured to modify live-phase documents 155 and/or configuration files to cause a set of live-phase documents 155 to be configured to be displayed to all, or a subset, of employees. The subset of live-phase documents 155 configured to be displayed to employees can include information about an employee's health care or employee's family. In some embodiments, the subset of live-phase documents 155 configured to be displayed to employees provide a form where a medical claim can be entered, which can include information used to determine a type of physician to provide information associated with the claim to. For example, an employee can enter information about a rash or back pain via employee terminal 172.

In some embodiments, nonmedical staffer terminal 174, record specialist terminal 176, staff physician terminal 178, and/or specialized physician terminal 180 can be configured to access live-phase documents 155 created in development environment 105, tested and/or modified in testing environment 120, displayed and/or tested in staging environment 130, and/or deployed into live environment 150. These terminals can access live-phase documents 155 that may not be available to entity representative terminal 170 and/or employee terminal 172. For example, documents accessible by nonmedical staffer terminal 174, record specialist terminal 176, staff physician terminal 178, and/or specialized physician terminal 180 can access documents that include claim information, personal identifying information, and/or health/medical records. This information can include sensitive information, and live-phase documents 155 configuration files 117, and other documents can be configured to not display some or all information associated with employees (or other users).

In some embodiments, data representing changes to a configuration file can be acquired (step 770) from one or more remote devices. These changes can be used to create a modified configuration file, which can be inputted into diff utility 160. Diff utility 160 can also acquire an original, corresponding configuration file 117, and create a diff file or otherwise indicate changes to the original configuration file 117 by comparing a modified configuration file with the original configuration file 117, for example. By using diff utility 160, software developers, entity representative terminals, and/or other users can be unable to view information associated with an employee/patient.

After acquiring data representing changes to one or more configuration files 117, information can be stored (step 780) as an updated configuration file and reflect the acquired data. This information can be stored with other configuration files 117. In some embodiments, this information can be stored in live environment 150. The method 700 can then end at step 790.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. Moreover, it is intended that descriptions and examples related to specific domains are not limiting and that the disclosed embodiments can be applied to a variety of different domains. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer system comprising:
a data storage configured to store a configuration file;
one or more processors configured to execute instructions;
a configuration environment comprising:
   a testing environment configured to show a set of one or more documents of one or more sets of documents in a first condition, wherein the set of one or more documents of the one or more sets of documents in the first condition include one or more indicators that indicate one or more areas of the set of one or more documents can be modified; and
   a staging environment configured to show the set of one or more documents of the one or more sets of documents in a second condition, wherein at least a portion of the set of one or more documents are configured to incorporate a configuration file while shown in the staging environment; and
a deployment module configured to deploy the set of one or more documents into a live environment, wherein:
   the live environment is configured to show the set of one or more documents of the one or more sets of documents in the second condition;
   at least a portion of the set of one or more documents are configured to incorporate a configuration file while shown in the live environment; and
   at least a portion of the set of one or more documents are configured to receive an input used to modify the configuration file while the set of one or more documents are deployed in the live environment.

2. The computer system of claim 1, wherein the computer system is configured to provide a difference between a current version of the configuration file and a previous version of the configuration file, and wherein the difference includes data indicating a modified portion of the previous version of the configuration file.

3. The computer system of claim 1, wherein the configuration environment is part of an enterprise content management system.

4. The computer system of claim 1, wherein the configuration file includes a name of a healthcare plan user and a healthcare plan associated with the healthcare plan user.

5. The computer system of claim 1, wherein the testing environment includes tools to modify the set of one or more documents.

6. A method performed by a content management system having one or more processors, the content management system including a testing environment, a staging environment, and a live environment, the method comprising:
   acquiring a set of one or more documents from a development environment;
   obtaining a configuration file;
   providing the set of one or more documents to the testing environment, wherein the testing environment shows the set of one or more documents in a first condition, wherein the set of one or more documents in the first condition include one or more indicators that indicate one or more areas of the set of one or more documents can be modified;
   providing the set of one or more documents and the configuration file to the staging environment, wherein the staging environment shows the set of one or more documents in a second condition, wherein at least a portion of the set of one or more documents are configured to incorporate the configuration file while shown in the staging environment; and
   deploying the set of one or more documents and the configuration file to a live environment, wherein:
      the live environment shows the set of one or more documents in the second condition;
      at least a portion of the set of one or more documents are configured to incorporate the configuration file while shown in the live environment; and
      at least a portion of the set of one or more documents are configured to receive an input used to modify the configuration file while the set of one or more documents are deployed in the live environment.

7. The method of claim 6, further comprising:
   providing a difference between a current version of the configuration file and a previous version of the configuration file, wherein the difference includes data indicating a modified portion of the previous version of the configuration file.

8. The method of claim 6, wherein the configuration environment is part of an enterprise content management system.

9. The method of claim 6, wherein the configuration file includes a name of a healthcare plan user and a healthcare plan associated with the healthcare plan user.

10. The method of claim 6, wherein the testing environment includes tools to modify the set of one or more documents.

11. The method of claim 6, further comprising:
   obtaining a second configuration file, wherein at least a portion of the set of one or more documents are configured to incorporate the second configuration file while shown in the staging environment, and wherein at least a portion of the set of one or more documents are configured to incorporate the second configuration file while shown in the live environment.

12. A non-transitory computer-readable storage medium storing instructions that are executable by a first computing device that includes one or more processors to cause the first computing device to perform a method for deploying documents into a live environment, the method comprising:
   obtaining a configuration file;
   providing a configuration environment comprising:
      a testing environment configured to show a set of one or more documents of one or more sets of documents in a first condition, wherein the set of one or more documents of the one or more sets of documents in the first condition include one or more indicators that indicate one or more areas of the set of one or more documents can be modified; and
      a staging environment configured to show the set of one or more documents of the one or more sets of documents in a second condition and functionality associated with the set of one or more documents, wherein at least a portion of the set of one or more documents are configured to incorporate a configuration file while shown in the staging environment; and
   deploying the set of one or more documents and the configuration file to a live environment, wherein:
      the live environment shows the set of one or more documents of the one or more sets of documents in the second condition;
      at least a portion of the set of one or more documents are configured to incorporate the configuration file while shown in the live environment; and
      at least a portion of the set of one or more documents are configured to receive an input used to modify the configuration file while the set of one or more documents are deployed in the live environment.

13. The non-transitory computer-readable storage medium of claim 12, wherein the instructions that are executable by the first computing device cause the first computing device to further perform:
   providing a difference between a current version of the configuration file and a previous version of the configuration file, wherein the difference includes data indicating a modified portion of the previous version of the configuration file.

14. The non-transitory computer-readable storage medium of claim 12, wherein the configuration environment is part of an enterprise content management system.

15. The non-transitory computer-readable storage medium of claim 12, wherein the configuration file includes a name of a healthcare plan user and a healthcare plan associated with the healthcare plan user.

16. The non-transitory computer-readable storage medium of claim 12, wherein the testing environment includes tools to modify the set of one or more documents.

17. The non-transitory computer-readable storage medium of claim 12, wherein the instructions that are executable by the first computing device cause the first computing device to further perform:
   obtaining a second configuration file, wherein at least a portion of the set of one or more documents are configured to incorporate the second configuration file while shown in the staging environment, and wherein at least a portion of the set of one or more documents are configured to incorporate the second configuration file while shown in the live environment.

\* \* \* \* \*